United States Patent [19]

Nihei et al.

[11] Patent Number: 5,415,057
[45] Date of Patent: May 16, 1995

[54] BALANCER DEVICE FOR A ROBOT ARM

[75] Inventors: Ryo Nihei, Fujiyoshida; Yasuo Naito, Minamitsuru; Takeshi Okada, Minamitsuru; Tsutomu Miyagawa, Minamitsuru, all of Japan

[73] Assignee: Fanuc, Ltd., Yamanishi, Japan

[21] Appl. No.: 140,077

[22] PCT Filed: Mar. 1, 1993

[86] PCT No.: PCT/JP93/00256

§ 371 Date: Nov. 4, 1993

§ 102(e) Date: Nov. 4, 1993

[87] PCT Pub. No.: WO93/17839

PCT Pub. Date: Sep. 16, 1993

[30] Foreign Application Priority Data

Mar. 5, 1992 [JP] Japan .................. 4-048615

[51] Int. Cl.6 .................. B25J 18/00; B66C 23/72
[52] U.S. Cl. .................. 74/490.01; 16/1 C; 248/280.1; 248/292.1; 901/48
[58] Field of Search .................. 74/479 B; 16/1 C; 248/280.1, 292.1; 901/48

[56] References Cited

U.S. PATENT DOCUMENTS

| | | | |
|---|---|---|---|
| 4,297,908 | 11/1981 | Zimmer | 901/48 X |
| 4,383,455 | 5/1983 | Tuda et al | 248/292.1 X |
| 4,500,251 | 2/1985 | Kiryu et al. | 248/292.1 X |
| 4,696,197 | 9/1987 | Hannel | 901/48 X |
| 4,728,247 | 3/1988 | Nakahima et al. | 248/292.1 X |
| 4,784,010 | 11/1988 | Wood et al. | 248/292.1 X |
| 4,904,150 | 2/1990 | Scvensson et al. | 901/48 X |
| 5,134,805 | 8/1992 | Frantzen et al. | 16/1 C X |

FOREIGN PATENT DOCUMENTS

412147A1  1/1993  Germany .
59-73295   4/1984  Japan .
59-115190  7/1984  Japan .

OTHER PUBLICATIONS

IBM Technical Disclosure Bulletin, vol. 24, No. 9, Feb. 1982, pp. 4497–4499, "Counter–Balancing System For Revolute Joint" by A. E. Brennemann and D. D. Grossman.

Primary Examiner—Allan D. Herrmann
Attorney, Agent, or Firm—Nikaido, Marmelstein, Murray & Oram

[57] ABSTRACT

A balancer device for balancing the moment generated by gravity on a robot arm, which is mounted at the one end thereof for rotation about a rotation axis and having an articulation on the opposite end, comprises a fluid-pressure operated spring means (7), an attachment portion (6) provided on the robot arm near the articulation, a tension transmitting member (2) for applying tension to the robot arm (1) by cooperation with the fluid-pressure operated spring means (7), and a plurality of guide means (3, 4, 5) provided for rotation extending and guiding the tension transmitting member (2). The tension transmitting member (2) is extended so as to pass the plurality of guide means (3, 4, 5) and the attachment portion (6), and to apply tension to the robot arm (1), whereby the balancer device balances the moment by gravity on the robot arm (1).

9 Claims, 4 Drawing Sheets

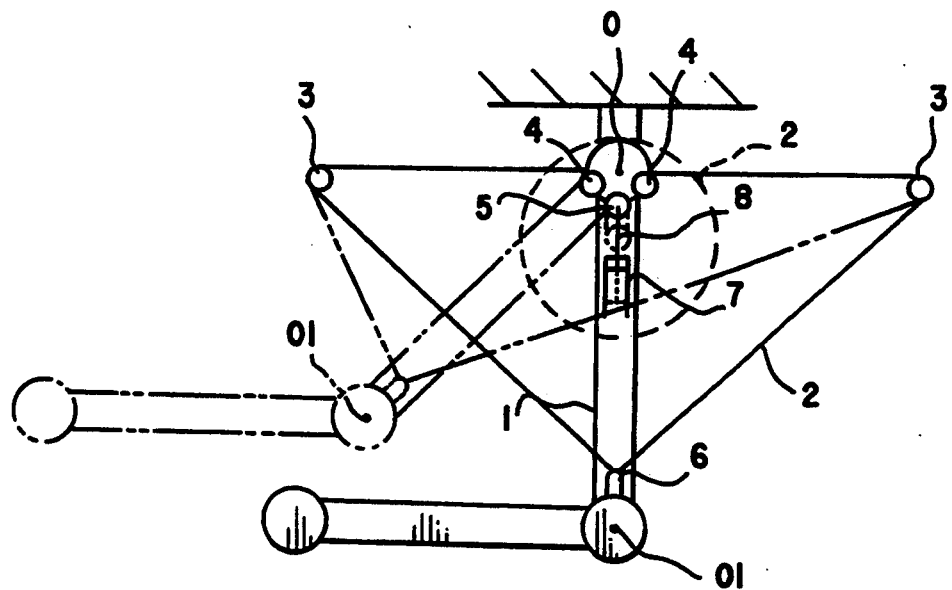
Fig.1
Fig.2
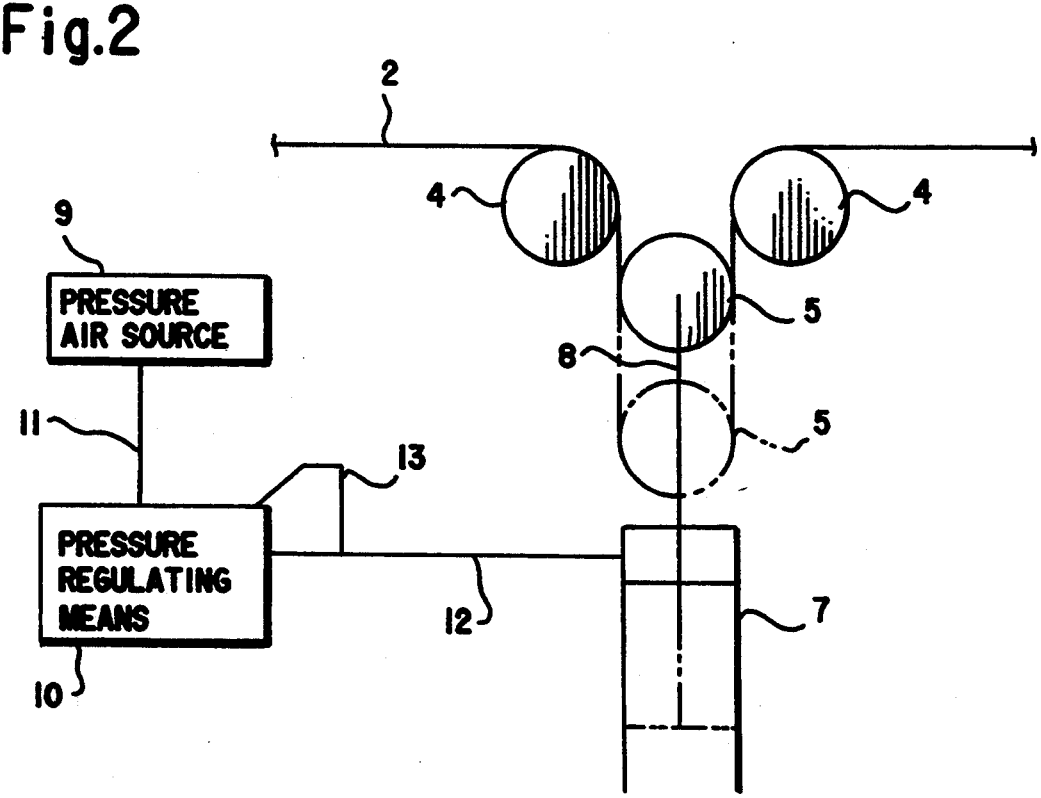

$M = LT(\sin\theta - \sin\theta')$

COUNTER TORQUE GENERATED BY GRAVITY ON BALANCE WEIGHT

MOMENT GENERATED BY GRAVITY ON ARM

BALANCER DEVICE FOR A ROBOT ARM

TECHNICAL FIELD

The invention relates to a balancer device for an industrial robot. In particular, the invention relates to a light weight balancer device for a robot arm, which can balance the moment applied to the robot arm effectively when the robot is suspended from a ceiling or when the robot is supported on a floor. Furthermore, the balancer device can reduce the load on the driving system for the robot arm.

BACKGROUND ART

As is well known, a robot arm of an industrial robot comprises at least one articulated mechanism such as a pivot joint or a universal joint in order to obtain a desired movement in three dimensional space. Additionally, an end effector, such as a tool, an implement or a hand to grasp a workpiece, is attached to a wrist provided at the distal end of the robot arm. The articulated mechanism and the end effector have considerable weight. Thus, a considerable moment is generated by gravity on the articulated mechanism, the end effector, and the work on the robot arm. Therefore, considerable torque is necessary in order to move the robot arm against the moment generated by gravity, which results in a considerable load on the driving system, such as a servo-motor, for the robot arm. In order to reduce the load on the driving system, the conventional industrial robot comprises a balancer device applying a counter torque which cancels the moment, generated by gravity, on the robot arm.

FIG. 4 illustrates a conventional balancer device, as one example, which uses the moment generated by gravity on a balance weight. The balancer device comprises a balance weight positioned on the opposite side of the robot arm to generate counter torque.

FIG. 5 illustrates another conventional balancer device using force of a spring. The balancer device comprises a spring means S, such as a coil spring, attached to a point 14 positioned at a distance from the rotational center of the robot arm and to a point 15 positioned on a robot arm. The balancer device uses the force of the spring to generate a counter torque.

The conventional balancer devices are widely used because of their simple construction and the low cost. However, they have disadvantages as described below.

The balancer device of FIG. 4 uses the balance weight having considerable weight in order to obtain the enough counter torque. Thus, the balancer device adds weight to the robot arm and impairs the maneuverability, the response characteristics, and the positioning accuracy of the robot arm.

On the other hand, when the balancer device of FIG. 5 is mounted on a ceiling at the site where the robot is used, as shown in FIG. 6, the balancer device cannot obtain the counter torque since the direction of the torque by the spring corresponds to that of the moment by gravity. However, if the balancer device comprises a mechanism, as shown in FIG. 7, using a wire W and the spring means S, the balancer device can generate a counter torque by the tension in the wire W. In FIG. 7, the tension in the wire W is equal to the spring force of the spring means S. Thus, the relation of the tension in the wire W when the robot arm is at the lowest point to that of the wire W when the robot arm is at another position is represented as follow $$\Delta X\ 1 \cdot k > \Delta X\ 2 \cdot k \tag{1}$$

where
- k: spring constant
- $\Delta X\ 1$: elongation of the spring when the robot arm is at the lowest point
- $\Delta X\ 2$: elongation of the spring when the robot arm is at a position other than the lowest point From FIG. 7 and the inequality (1), it may be understood that the counter torque is minimum when the rotational angle $\theta$ of the robot arm is maximum, that is, when the moment by gravity applied to the robot arm is maximum. Therefore, the balancer device of FIG. 7 cannot act suitably as a balancer device.

DISCLOSURE OF THE INVENTION

The object of the invention is to provide a balancer device which is light in weight and can effectively balance a robot arm which is mounted at any attitude.

In order to achieve the object of the invention, there is provided a balancer device for balancing the moment generated by gravity on a robot arm, the robot arm being mounted, at the one end thereof, for rotation about a rotation axis and having an articulation on the opposite end, the balancer device comprising:
- a fluid-pressure operated spring means having a working element which can advance and retract along a linear axis;
- an attachment portion provided on the robot arm near the articulation;
- a tension transmitting member for applying tension to the attachment portion by cooperation with the fluid-pressure operated spring means;
- a plurality of rotational guide means for extending and guiding the tension transmitting member; and
- the tension transmitting member being extended so as to pass the plurality of guide means and the attachment portion, and to apply the tension to the attachment portion in two different directions, whereby the balancer device balances the moment generated by gravity on the robot arm.

In the invention, at least one guide means of the plurality of guide means is attached to the working element of the fluid pressure operated spring means, on the other hand, the other guide means may be positioned outside of the robot arm so that the tension transmitting member applies the tension to the attachment portion in suitable directions, the fluid pressure operated spring means may be controlled so as to advance or retract in response to the movement of the robot arm in order to maintain the tension transmitting member under tension.

In the preferred embodiment, the fluid pressure operated spring means may be attached to a robot where the balancer device is mounted.

The fluid pressure operated spring means is preferably an air cylinder in which working fluid is air.

Furthermore, the fluid pressure operated spring means is controlled by a controller comprising an air pressure source and a pressure regulating valve so that the pressure within the cylinder is maintained at a constant pressure.

In accordance with the characteristics of the invention, the fluid pressure operated spring means may be a hydraulic cylinder.

In preferred embodiment, the tension transmitting member is a wire, and the plurality of guide means are pulleys.

Furthermore, the plurality of guide means may be fixed pulleys.

In accordance with the yet further characteristics of the invention the tension transmitting member may be a chain, and the plurality of guide means may be sprockets.

BRIEF DESCRIPTION OF THE DRAWINGS

In the following detailed description of the invention reference is made to the drawings, in which:

FIG. 1 is a schematic illustration of an embodiment of a balancer device for a robot arm in accordance with the invention.

FIG. 2 is an enlarged illustration of the portion, indicated by "2" in FIG. 1, with a controller for a pressure actuating means.

BEST MODE FOR CARRYING OUT THE INVENTION

Figure 3:
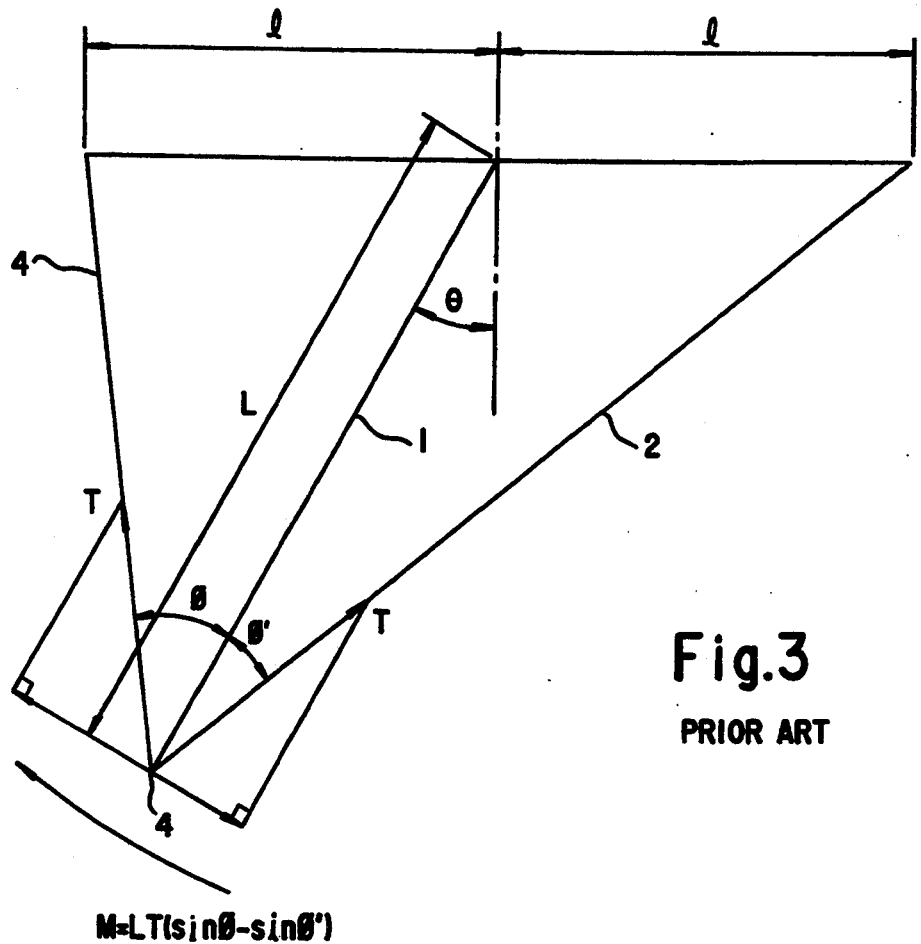
FIG. 3 is a schematic illustration to explain the principle of generating the counter torque by the balancer device in according with the invention.
Figure 4:
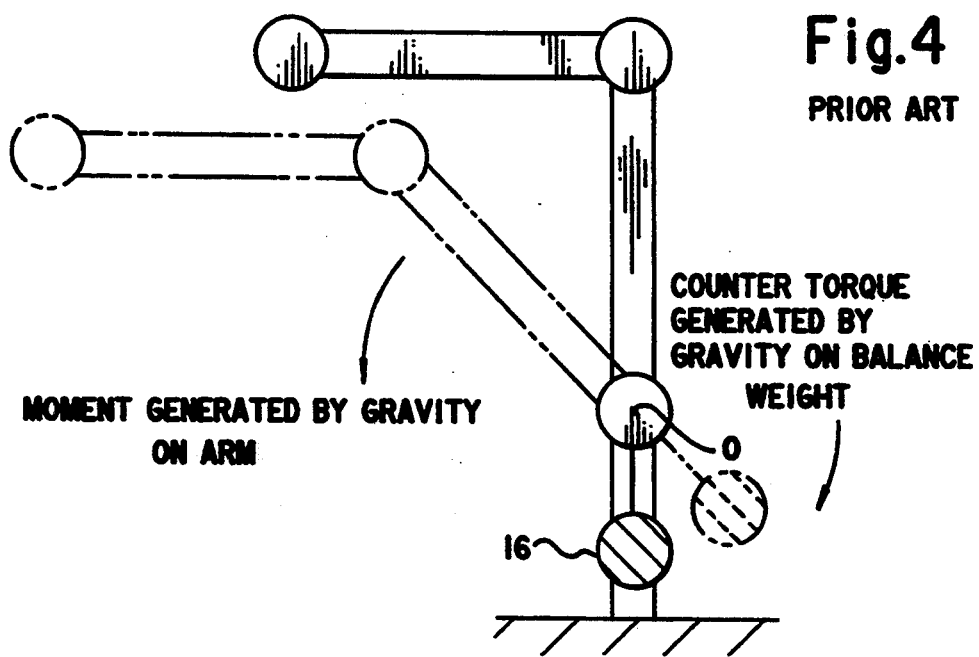
FIG. 4 is an prior art balancer device which generate the counter torque by a balance weight.
Figure 5:
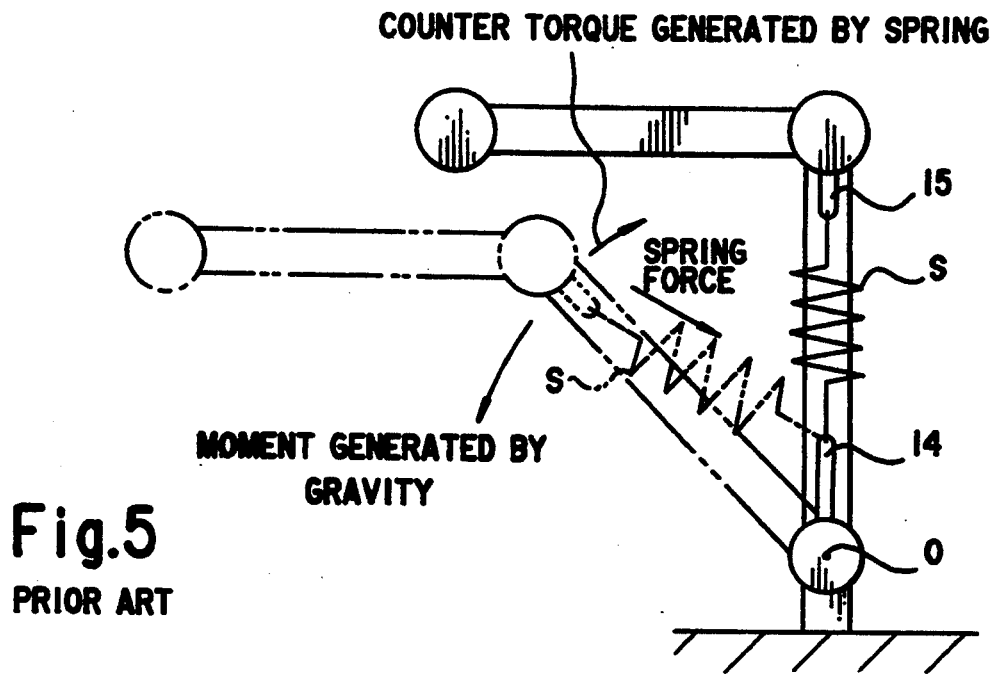
FIG. 5 is an prior art balancer device which generate the counter torque by spring force.
Figure 6:
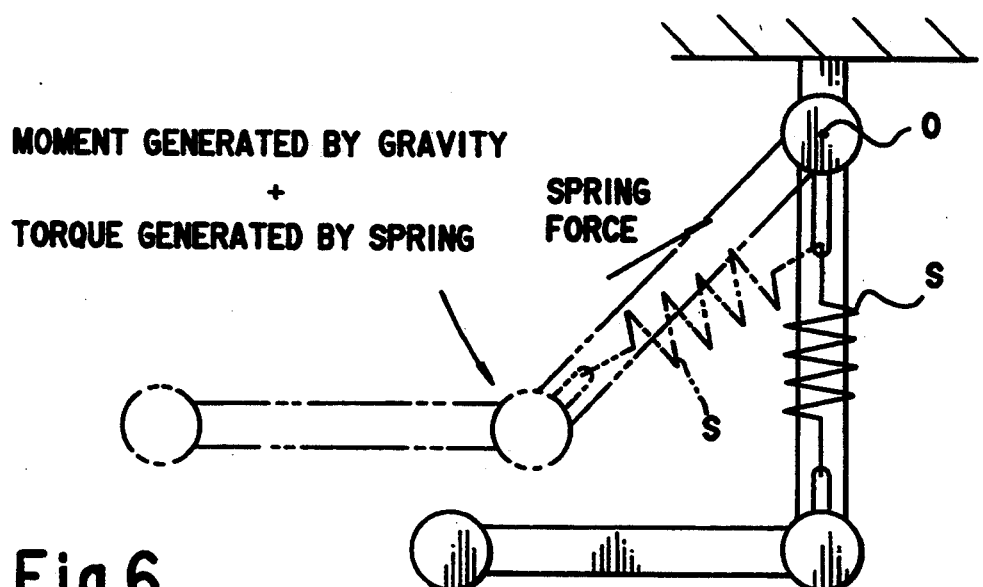
FIG. 6 is a schematic illustration to explain the problems in the prior art.
Figure 7:
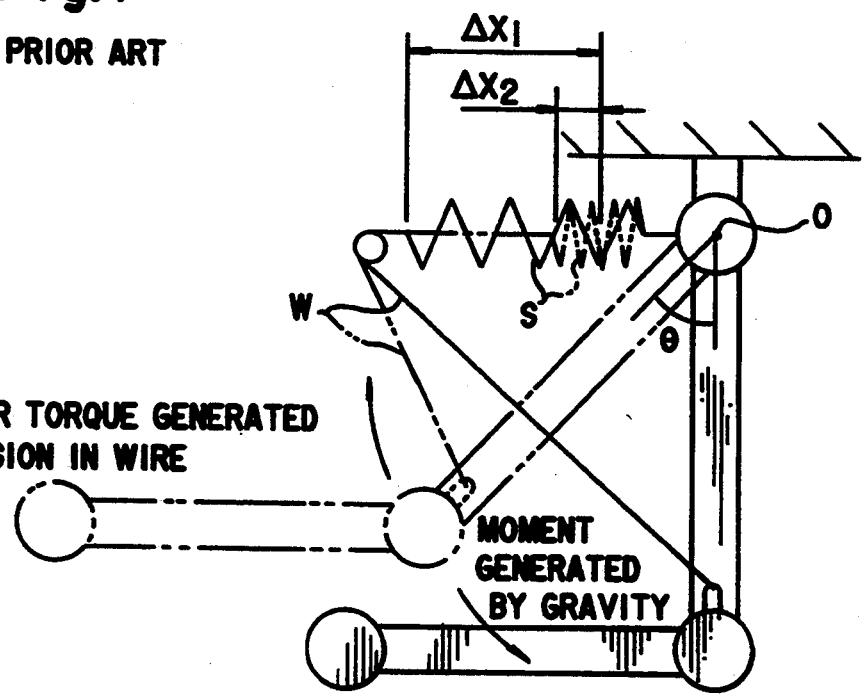
FIG. 7 is another schematic illustration to explain the problems in the prior art.

Firstly, with reference FIGS. 1 and 2, a description is made of the most preferred embodiment of a balancer device for a robot arm in accordance with the invention, in which the robot arm is suspended from a ceiling.

In FIG. 1, the robot arm 1 is mounted for rotation about a rotation axis "0". In FIG. 1, the robot arm 1 at its lowest position is shown by solid line, and at a position other than its lowest position is shown by dotted line.

The balancer device in accordance with the invention comprises a fluid pressure operated spring means 7 positioned in an area near the rotation axis 0 (that is, the area indicated by "A" in FIG. 1). The spring means 7 contains a working rod 8 comprising a piston rod which can advance and retract along an axis which is advantageously selected in consideration of the position where the robot is mounted. The fluid for the spring means 7 is controlled by a controller described below so that the pressure within the cylinder of the spring means is at a constant level. In the most preferred embodiment, the pressure operated spring means 7 is an air cylinder, in which the working medium is air. As shown in FIG. 1, a first guide means 5 is provided at the end of the piston rod 8 of the air cylinder 7.

Additionally, the balancer device is provided with second and third guide means 4 and 3 positioned at positions outside the robot. The second and the third guide means 4 and 3 are positioned so that the counter torque is applied appropriately to the robot arm 1 by the force transmitted by a tension transmitting member 2 as described below. In FIG. 1, the second and the third guide means 4 and 3 are symmetrically positioned with relation to the robot arm 1 into a generally triangular arrangement. However, the invention is not limited to the above arrangement.

The robot arm 1 comprises an attachment portion 6 for the tension transmitting member near a first articulation 01 thereof. The tension transmitting member 2, such as a wire or chain, is attached to the attachment portion 6. The tension transmitting member 2 is extended and held under tension through the guide means 3, 4, and 5. In the most preferred embodiment, the tension transmitting member 2 comprises a flexible wire having enough strength to transmit a force to the robot arm 1. The first, the second, and the third guide means 5, 4, and 3 are known pulleys corresponding to the tension transmitting member 2. It is apparent that when the transmitting member 2 is a chain or other means, the first, the second, and the third guide means are replaced by sprockets or other suitable means.

The wire 2 is attached to the attachment portion 6 in a known manner so that the wire 2 is drawn in two different directions and the tension in the respective wire portions is applied to the attachment portion 6. For example, the wire may be attached to the attachment portion 6 by a pulley (not shown) provided on the attachment portion.

The wire 2 moves as shown by the dotted line in FIG. 1 when the robot arm 1 moves at the articulations 0 and 01. Thus, the respective distances between the third pulleys 3 and the attachment portion 6 are varied, during which the air cylinder 7 is controlled so that the pressure within the cylinder thereof is constant and the piston rod 8 advances or retracts. This results in the slack in the wire 2 absorbed. Thus, the tension in the wire 2 is maintained at a constant level. The balancer device of the invention obtains the counter torque from the tension in the wire 2.

A description is made of the balancer device in more detail with reference FIG. 2. FIG. 2 is an enlarged illustration of the portion indicated by "A" in FIG. 1.

As described above, the first pulley 5 is rotationally attached to an end of the piston rod 8 of the air cylinder 7 opposite to the end the rod where a piston is provided. The second pulleys 4 are arranged at the either sides of the first pulley 5. The first and the second pulleys 5 and 4 are arranged so that the respective portions of the wire 2 extended between the first and the second pulleys aligned generally parallel to a direction along which the piston of the air cylinder moves. The wire 2 is extended through the first, the second, and the third pulleys 5, 4, and 3 and is always maintained under tension by moving the piston rod 8 of the air cylinder 7 with response to the movement of the robot arm 1.

The air cylinder 7 is a type of generally available in the market. Compressed air is supplied to the pressure regulating means 10 from a pressure air source 9, such as a compressor, through a primary air path 11. The pressure regulating means 10 reduces the pressure of the air within the first air path to a predetermined constant pressure so that the pressure within the cylinder is maintained at a constant level. The air is then supplied to the air cylinder 7 through a secondary path 12. In this embodiment, the pressure regulating means 10 is a pressure reducing and relieving valve which is available in the market. The pressure reducing valve 10 detects the pressure within the air cylinder 7 through a feed back path 13 branched from the secondary air path 12, and controls the pressure when the air cylinder 7 is moved.

The pressure operated spring means 7 is only a means for maintaining the wire 2 under constant tension is response to the movement of the robot arm 1. Therefore, the balancer device of the invention is not limited to an air cylinder as the pressure operated spring means. The pressure operated spring means 7 can be replaced by other pressure operated means having an equivalent function, for example, a hydraulic cylinder. In this case, it is apparent that the pressure source 9, the pressure regulating means 10 and the other controlling elements must be replaced by a suitable pressure source, pressure regulating means, and the other controlling elements to work with the actual working fluid.

FIG. 3 is a schematic illustration of the balancer device of the invention in which the robot arm and the wire are simplified. In the following, a description is made of the principle the balancer device generates the counter torque.

When the robot arm 1 is at an angular position Θ, the counter torque generated by the tension T in the wire 2 is applied to the robot arm and the counter torque is represented by the following equation:

$$M = LT(\sin \Phi - \sin \Phi') \quad (2)$$

where,
- L: the length between the rotational center of the robot arm and the connecting portion for the tension transmitting member.
- Φ: the angle between the robot arm and the tension transmitting member about the connecting portion for the tension transmitting member.
- Φ': the angle between the robot arm and the tension transmitting member about the connecting portion for the tension transmitting member. regarding Φ in the above symbols, the angle between the robot arm and the longer portion of the tension transmitting member is indicated by "'" (prime).

In the physical relationship shown in FIG. 3, the following is apparent:

$$\sin \Phi > \sin \Phi' \quad (2)$$

Therefore, it may be understood that the counter torque, which always rotates the robot arm in the upward direction, that is, the counter torque, opposite to the moment by gravity, is applied to the robot arm 1 by the tension in the wire 2. If Θ increases, then Φ increases and Φ' decreases. Therefore, when Θ increases, the counter torque also increases. This is the considerable advantage of the invention.

The distance between the third pulleys 3 and the attachment portion 6 varies according to the position of the robot arm 1. The total length LW of the length between the third pulleys 3 and the attachment portion 6 and the length between the third pulleys 3 and second pulleys 4 is generally represented by the following equation with relation to the angular position Θ of the robot arm 1:

$$LW(\Theta) = (L^2 + l^2 + 2Ll \sin \Theta)^{\frac{1}{2}} + (L^2 + l^2 - 2Ll \sin \Theta)^{\frac{1}{2}} + C \quad (4)$$

where C is a constant value.

If the wire 2 cannot be appropriately pulled by the air cylinder 7 corresponding to the variation of LW (Θ), then the wire 2 is loosen. However, the wire 2 can be satisfactorily pulled if the stroke LS of the air cylinder 7 is as follow:

$$LS > (LW(0) - LW(\Theta_{max}))/2 \quad (5)$$

It is apparent that the balancer device in accordance with the invention is very light in weight since it uses a pressure operated spring means which can be positioned outside the robot, and contains only the guide means and the attachment portion for the tension transmitting member provided on the robot.

The invention is described based on the balancer device for the industrial robot suspended from the ceiling as the most preferred embodiment. This embodiment is one example in which the invention is applied most effectively. The balancer device in accordance with the invention, however, can be applied to a robot supported on a floor or on a wall.

A balancer device which is light in weight and can effectively balance a robot arm which is positioned at any attitude provided by the invention. In particular, the balancer device can reduce the load on the driving source, such as a servo-motor, driving the robot arm of the robot which is suspended from the ceiling without impairing the maneuverability of the robot.

Furthermore, as described above, the balancer device of the invention obtains the counter torque by the tension in the tension transmitting member applied to the robot arm. The tension in the tension transmitting member is controlled by the pressure within the cylinder of the fluid pressure operated spring means. Thus, when the magnitude of the counter torque must be changed because an end effector attached to the of the robot arm or the work grasped by the end effector is changed, the balancer device of the invention can easily and quickly be adjusted by only changing the pressure within the cylinder of the fluid pressure operated spring means, that is, by changing the set pressure of the secondary side of the pressure regulating means without changing the equipment of the robot. This results in another advantage of the invention, in particular, when the robot is mounted in a high, distant, or narrow place where the operator cannot easily access the equipment or the equipment cannot be easily changed.

We claim:

1. A balancer device for balancing the moment generated by gravity on a robot arm, said robot arm being mounted, at the one end thereof, for rotation about a rotation axis and having an articulation on the opposite end, said balancer device comprising:
   - a fluid-pressure operated spring means having a working element which can advance and retract along a linear axis;
   - an attachment portion provided on the robot arm near said articulation;
   - a tension transmitting member for applying tension to said attachment portion by cooperation with said fluid-pressure operated spring means;
   - a plurality of rotational guide means for extending and guiding said tension transmitting member; and
   - said tension transmitting member being extended so as to operationally connect said plurality of guide means and said attachment portion, and to extend from said attachment portion in two different directions and to apply the tension to said attachment portion in said two different directions, whereby said balancer device balances the moment generated by gravity on said robot arm.

2. The balancer device according to claim 1 wherein at least one guide means of said plurality of guide means is attached to said working element of said fluid pressure operated spring means;

the other guide means being positioned outside of said robot arm so that said tension transmitting member applies said tension to said attachment portion in suitable directions; and said fluid pressure operated spring means being controlled so as to advance or retract in response to the movement of said robot arm in order to maintain said tension transmitting member under tension.

3. The balancer device according to claim 1 wherein said fluid pressure operated spring means is attached to a robot where said balancer device is mounted.

4. The balancer device according to claim 1 wherein said fluid pressure operated spring means is an air cylinder in which working fluid is air.

5. The balancer device according to claim 4 wherein said fluid pressure operated spring means is controlled by a controller comprising an air pressure source and a pressure regulating valve so that the pressure within said cylinder is maintained at a constant pressure.

6. The balancer device according to claim 1 wherein said fluid pressure operated spring means is a hydraulic cylinder.

7. The balancer device according to claim 1 wherein said tension transmitting member is a wire, and said a plurality of guide means are pulleys.

8. The balancer device according to claim 7 wherein said a plurality of guide means are fixed pulleys.

9. The balancer device according to claim 1 wherein said tension transmitting member is a chain, and said a plurality of guide means are sprockets.

* * * * *